(12) United States Patent
Freestone

(10) Patent No.: US 7,753,408 B2
(45) Date of Patent: Jul. 13, 2010

(54) COMPOSITE COMPONENT AND METHOD FOR PRODUCING A COMPOSITE COMPONENT

(75) Inventor: Martin Freestone, Breitenbrunn (DE)

(73) Assignee: Faurecia Innenraum Systeme GmbH, Hagenbach (DE)

( * ) Notice: Subject to any disclaimer, the term of this patent is extended or adjusted under 35 U.S.C. 154(b) by 486 days.

(21) Appl. No.: 11/666,977

(22) PCT Filed: Nov. 18, 2005

(86) PCT No.: PCT/EP2005/012373

§ 371 (c)(1),
(2), (4) Date: Jul. 9, 2007

(87) PCT Pub. No.: WO2006/053763

PCT Pub. Date: May 26, 2006

(65) Prior Publication Data

US 2008/0124557 A1 May 29, 2008

(30) Foreign Application Priority Data

Nov. 20, 2004 (DE) .................. 10 2004 056 148

(51) Int. Cl.
*B60R 21/05* (2006.01)
*B32B 5/18* (2006.01)

(52) U.S. Cl. .................. 280/750; 428/457; 428/425.8

(58) Field of Classification Search .................. None
See application file for complete search history.

(56) References Cited

U.S. PATENT DOCUMENTS 6,199,942 B1    3/2001  Carroll, III et al.
6,561,580 B1    5/2003  Bergey

FOREIGN PATENT DOCUMENTS

DE    10161155 A1    6/2003
GB    1440707        6/1976
JP    01182013       7/1989

OTHER PUBLICATIONS

International Search Report of International Application PCT/EP2005/012373 (partial English translation).
International Search Report of International Application PCT/EP2005/012373.

*Primary Examiner*—Ling Xu
(74) *Attorney, Agent, or Firm*—Matthew B. Dernier, Esq.; Gibson & Dernier LLP

(57) ABSTRACT

The invention relates to a composite component comprising an insert made of expanded metal surrounded by foamed material, particularly a steering column collision protection element.

8 Claims, 4 Drawing Sheets

Fig. 1
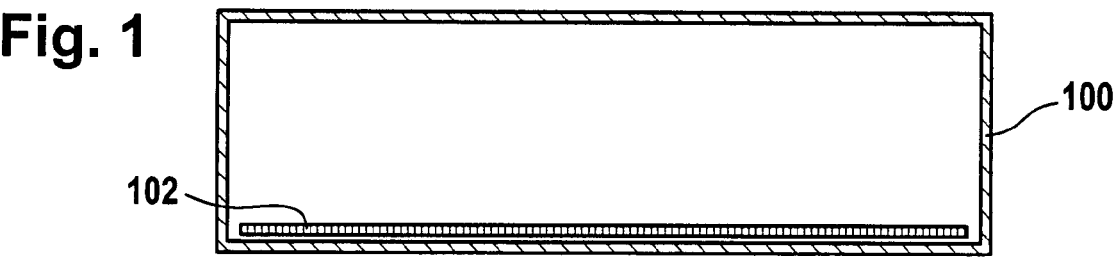
Fig. 2
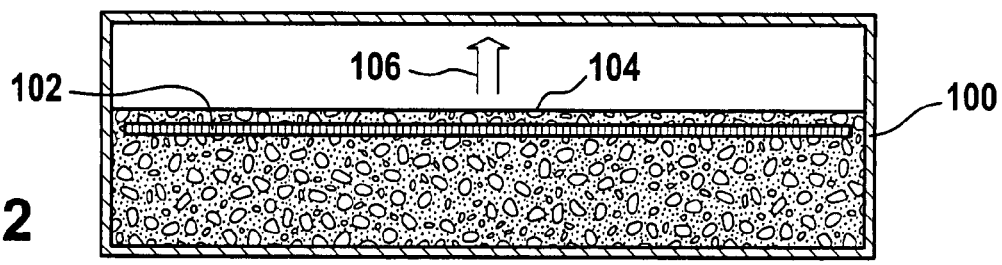
Fig. 3
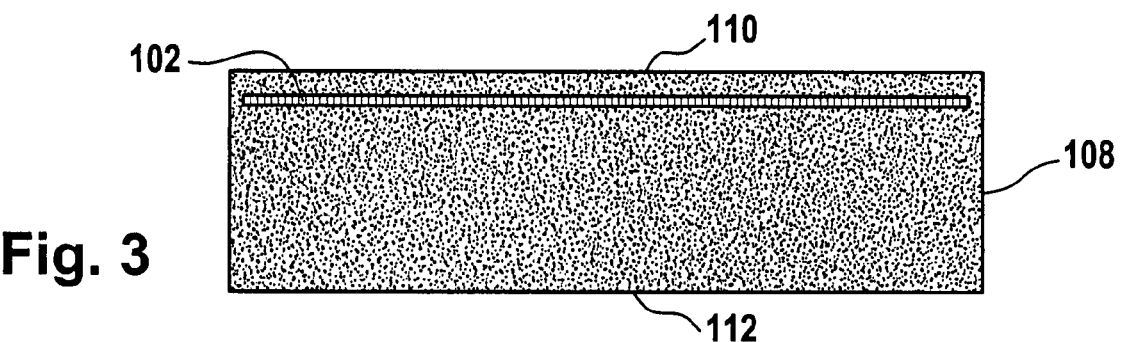
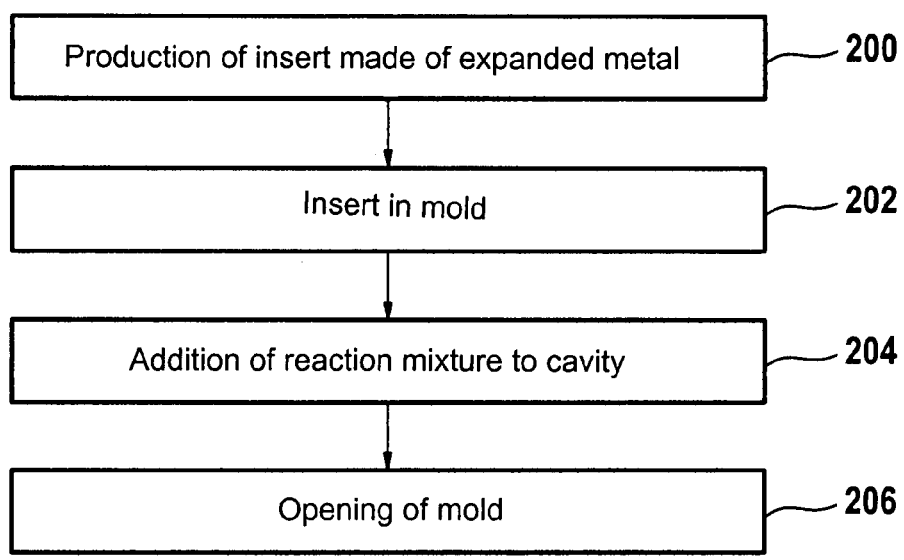
Fig. 4

COMPOSITE COMPONENT AND METHOD FOR PRODUCING A COMPOSITE COMPONENT

BACKGROUND

The invention relates to a composite component, particularly an impact absorber, a motor vehicle body component, a motor vehicle inside molding component, a structural component, such as a closure cap, as well as a vehicle seat, and to a method for producing a composite component.

From DE 101 61 155 A1, a composite component made of polyurethane comprising an insert is known. The insert is an object, which can be included entirely or partially in the fiber-reinforced polyurethane layer by foaming. The inserts are made of polymer and/or metal, such as steel, copper, zinc, aluminum or alloys thereof.

SUMMARY OF THE INVENTION

In contrast, it is the object of the invention to create an improved composite component, particularly an impact absorber, a steering column collision protection element, a motor vehicle body component, a motor vehicle inside molding component, a structural components such as a closure cap, as well as a vehicle seat, and to create a method for producing a composite component.

The invention creates a composite component comprising an insert made of expanded metal, which insert is surrounded by foamed material. Compared to conventional inserts made of metal, the insert made of metal according to the invention offers various advantages. In particular, less metal is required for achieving a certain rigidity of the composite component, resulting in weight and cost advantages. Furthermore, due to the wire openings of the expanded metal, a more homogeneous bond can be achieved between the metal and the foamed material. As a result, the mechanical load tolerance of the composite component can be improved.

According to one embodiment of the invention, the foamed material is polyurethane. Depending on the application, it can be a soft, medium hard or hard foamed material. To further increase the rigidity of the composite component, reinforcing materials, such as mineral fibers or glass fibers, can be added to the foamed material.

According to one embodiment of the invention, the insert made of expanded metal is disposed such that it abuts a surface of the composite component. The insert is therefore surrounded completely by foamed material and is provided in the vicinity of one of the surfaces of the composite material. This is advantageous for a variety of applications, particularly for applications as impact absorber and as a seat backrest.

According to one embodiment of the invention, the expanded metal is steel, copper, zinc, aluminum or an alloy.

According to one embodiment of the invention, the expanded metal has a wire structure with wire openings measuring about 10 mm to 30 mm in length, particularly 20 mm, and about 5 mm to 15 mm in width, particularly 10 mm.

According to one embodiment of the invention, the composite component forms an impact absorber. Such impact absorbers are installed, for example, in motor vehicles to improve the safety of the passengers in the event of a collision.

According to a further embodiment of the invention, the composite component is configured as a steering column collision protection element. A steering column collision protection element is configured for installation under the steering column between the steering wheel and the dashboard. The steering column collision protection element particularly serves as knee protection in the event of a collision, when the driver's knees are thrown in the direction of the steering column.

It is preferable if the insert made of expanded metal is disposed such that it abuts a surface of the steering column collision protection element, which is provided on the steering column after installation, so that the impact of the knees is with the side of the composite component opposite the insert in the event of a collision.

According to a further embodiment, the composite component is configured as a motor vehicle body component. It is particularly advantageous that the vehicle weight can be reduced, while maintaining or improving crash safety. Particularly the use of polyurethane also affects the acoustics advantages of such a motor vehicle body component according to the invention.

According to a further embodiment of the invention, the composite component is configured as a motor vehicle inside molding component. Such a motor vehicle inside molding component may serve purely decorative purposes and/or serve as an impact absorber. Furthermore, it can be a structural component, such as a closure cap, particularly a glove compartment cover, or a hat rack.

In a further aspect, the invention relates to a vehicle seat with an insert made of expanded metal covered in foam. Particularly the backrest of the vehicle seat may comprise such an insert covered in foam. By using the expanded metal, the weight can be reduced, while maintaining comfort and rigidity.

In a further aspect, the invention relates to a method for producing a composite component. First, an insert is produced by expanding a metal. The insert is given a wire-shaped structure, for example. The insert is placed in a mold. Then, a foaming reaction mixture is poured into the cavity formed by the mold. It is particularly advantageous that the foaming reaction mixture can homogeneously bond with the insert due to the wire-shaped structure of the insert.

The method according to the invention may particularly also be a reaction injection molding (RIM) method. Furthermore, it may also be high-speed RIM or reinforced RIM method, in which reinforcement materials such as mineral fibers or glass fibers are added to the reaction mixture.

According to one embodiment of the invention, the insert is not fastened to the mold, but instead is placed loosely in the mold, so that it can be moved at least with one degree of freedom. When placing the insert on the bottom of the cavity, for example, it can move in the direction of the side of the cavity opposite the bottom as the foaming reaction takes place. As a result, the insert is located such in the resulting composite component that it abuts the corresponding surface of the composite component.

Other aspects, features, and advantages of the present invention will be apparent to one skilled in the art from the description herein taken in conjunction with the accompanying drawings.

BRIEF DESCRIPTION OF THE DRAWINGS

Preferred embodiments of the invention will be explained in more detail hereinafter with reference to the drawings, wherein:

FIG. 1 shows a sectional view of the mold with the insert placed therein,

FIG. 2 shows the mold according to FIG. 1 after adding a foaming reaction mixture during the course of the reaction, FIG. 3 is the composite component obtained after the foaming reaction, FIG. 4 shows a flow chart of a method for producing a composite component.

DETAILED DESCRIPTION OF THE INVENTION

Figure 5:
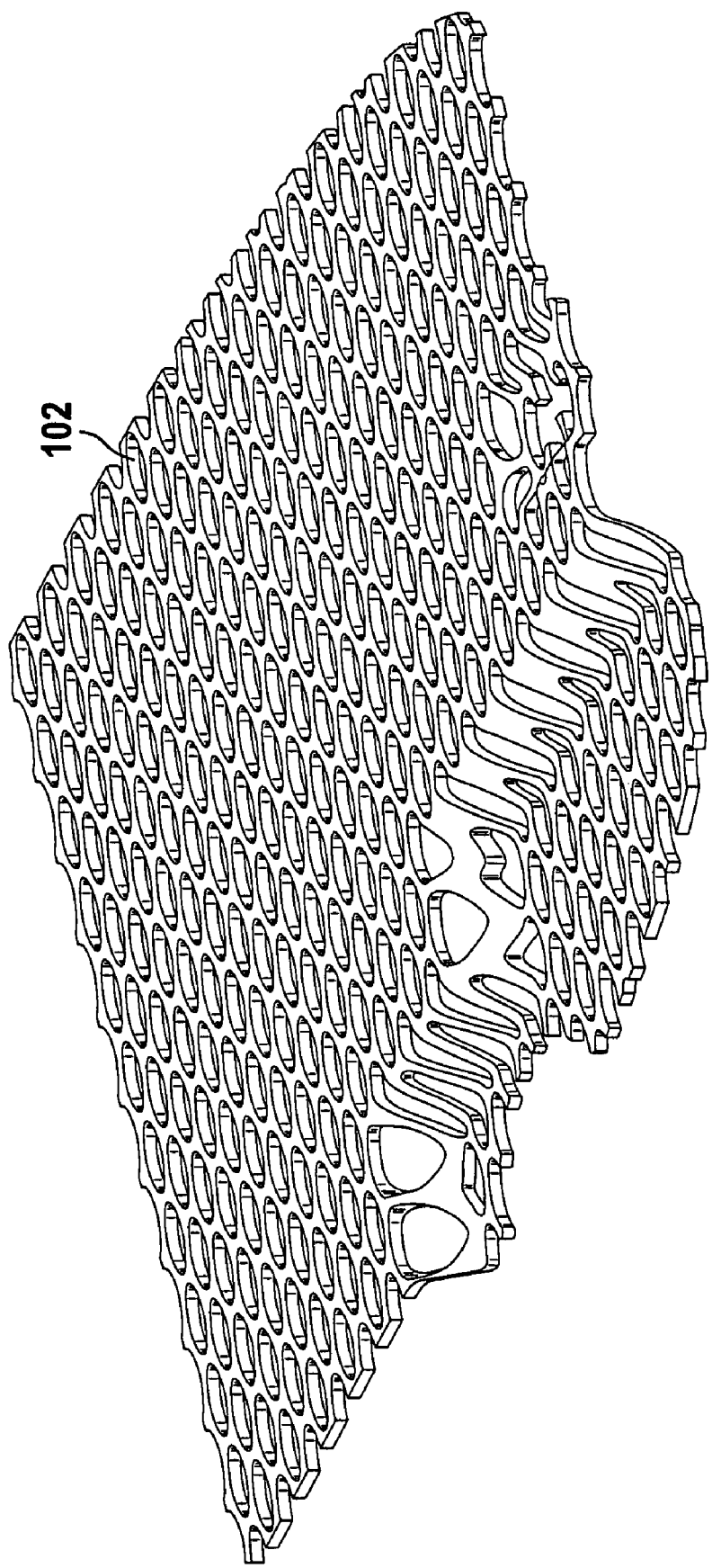
FIG. 5 is an insert made of expanded metal for an impact absorber, particularly a steering column collision protection element.

FIG. 1 shows a mold 100 with an insert 102 made of expanded metal that is placed in the mold 100. In the embodiment illustrated here, the insert 102 is placed on the bottom of the mold 100. The insert 102 is not fastened in the mold 100, but is instead placed loosely in the mold 100.

FIG. 2 shows the mold 100 after a foaming reaction mixture 104 has been poured into the cavity formed by the mold 100. During the reaction, the foaming reaction mixture 104 forms a homogeneous bond with the insert 102 and moves the insert 102 from the bottom of the mold 100 in the direction of the arrow 106 to the side of the mold 100 opposite the bottom.

After opening the mold 100, the composite component 108 with the insert 102 is obtained, which insert is disposed such that it abuts a surface 110 of the composite component 108, as is shown in FIG. 3.

The reaction mixture 104 poured into the mold 100 preferably comprises polymers, which are mixed with reactive components, such as polyol and isocyanate.

The composite component 108 is an impact absorber, for example, particularly a motor vehicle impact absorber, to improve the protection of passengers in the event of a collision. For example, the composite component 108 can be a steering column collision protection element, a motor vehicle body component, a motor vehicle inside molding component or another structural component. The composite component 108 can furthermore also be the seat surface or the backrest of a vehicle seat. In the latter case, the seat surface is formed by the surface 112 of the composite component opposite the surface 110.

FIG. 4 shows a corresponding flow chart. In step 200, an insert is produced by the expansion of metal. The insert produced this way has a wire-shaped structure with wire openings measuring, for example, 10 mm to 30 mm in length and 5 mm to 15 mm in width. In step 202, the insert is placed in a mold. In step 204, a reaction mixture capable of foaming is added to the cavity formed by the mold. After at least part of the reaction has taken place, the mold is opened (step 206), thus obtaining the composite component.

FIG. 5 shows one embodiment of the insert 102 made of expanded metal for the production of an impact absorber, particularly a steering column collision protection element.

Figure 6:
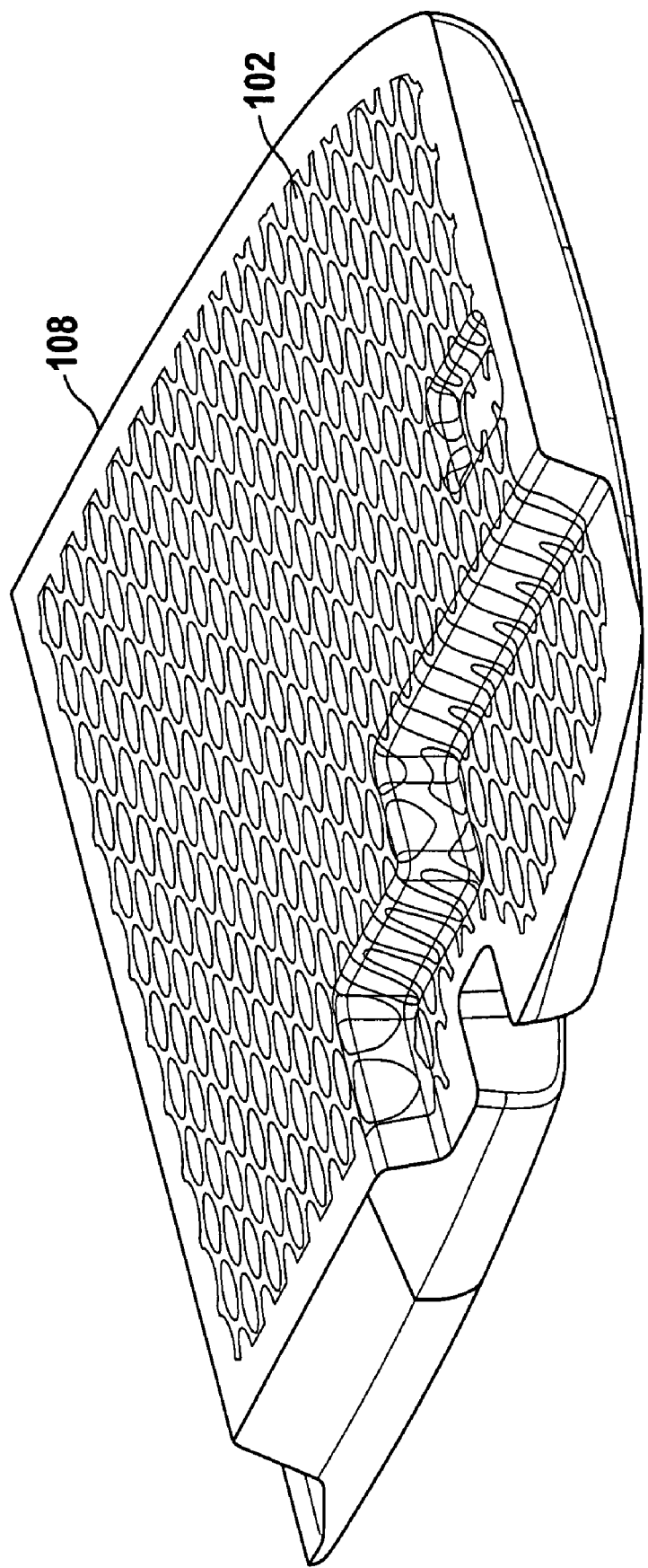
FIG. 6 is a steering column collision protection element with the insert according to FIG. 5.

FIG. 6 shows a steering column collision protection element 108, which has been produced with the help of the insert 102 according to FIG. 5 in a manner as explained with reference to FIGS. 1 to 4.

Figure 7:
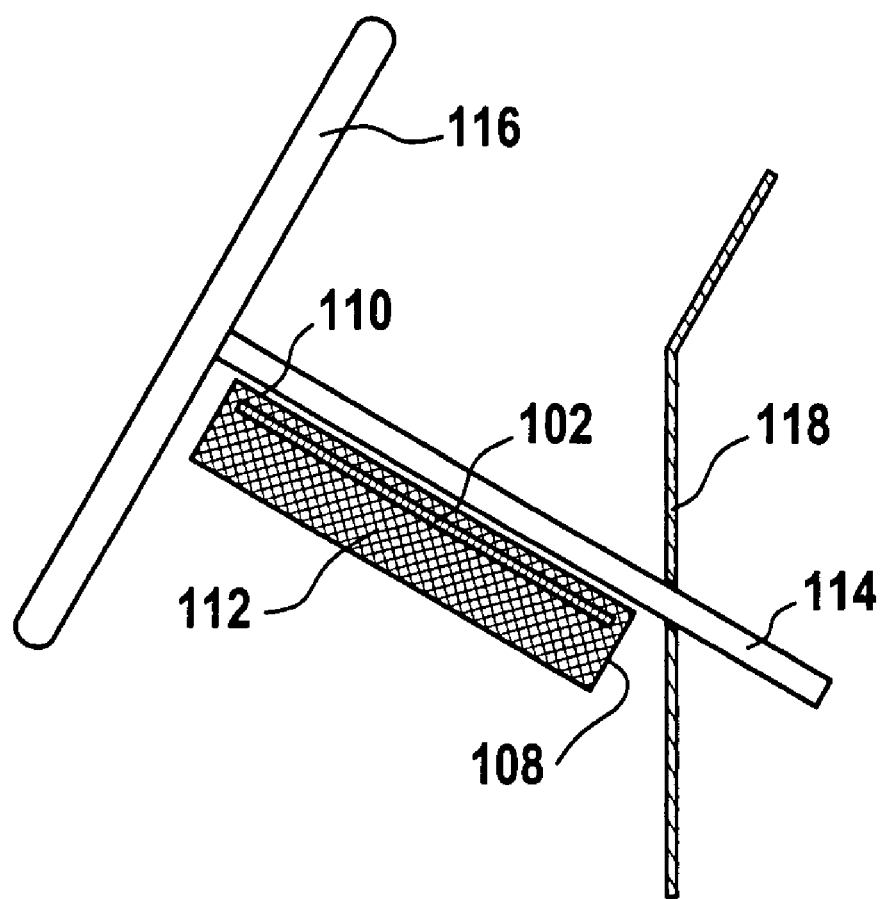
FIG. 7 is an installation position of the steering column collision protection element according to FIG. 6.

FIG. 7 shows an installation position of the steering column collision protection element 108 on a steering column 114 of a motor vehicle. The steering column collision protection element 108 is provided on the steering column 114 between a steering wheel 116 and a dashboard 118. The surface 110 with the insert 102 abutting the surface 110 is located on the steering column 114, thus allowing the driver's knees to impact the surface 112 of the steering column collision protection element 108 upon collision.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

LIST OF REFERENCE NUMERALS 100 mold
102 insert
104 reaction mixture
106 direction of arrow
108 composite material, steering column collision protection element
110 surface
112 surface
114 steering column
116 steering wheel
118 instrument

The invention claimed is:

1. A steering column collision protection element, comprising:
   a composite component installed on the steering column between a steering wheel and a vehicle dashboard, wherein the component further comprises:
      an insert made of expanded metal; and
      foamed material covering the expanded metal, wherein the insert is disposed abutting a surface of the composite component, which surface adjoins the steering column in one installation position of the composite component.

2. The steering column collision protection element according to claim 1, wherein the foamed material is polyurethane.

3. The steering column collision protection element according to claim 1, wherein the metal is steel, copper, zinc, aluminum or an alloy.

4. The steering column collision protection element according to claim 1, wherein the expanded metal comprises wire openings measuring one of: about 10 to 30 mm in length and about 5 mm to 15 mm in width; and about 20 mm in length and about 10 mm in width.

5. The steering column collision protection element according to claim 1, wherein the component is an impact absorber.

6. The steering column collision protection element according to claim 1, wherein the insert is surrounded completely by the foamed material.

7. The steering column collision protection element according to claim 1, wherein the foam penetrates all wire openings of the insert.

8. A vehicle comprising:
   a steering column with a composite component installed thereon between a steering wheel and a dashboard of the vehicle, wherein the composite component further comprises:
      an insert made of expanded metal; and
      foamed material covering the expanded metal wherein the insert is disposed abutting a surface of the composite component, which surface adjoins the steering column in one installation position of the composite component.

* * * * *